United States Patent
Federico et al.

(10) Patent No.: US 9,128,510 B2
(45) Date of Patent: Sep. 8, 2015

(54) DEPARTURE TIME SCHEDULING CONTROL SYSTEM FOR AN ELECTRIC VEHICLE

(75) Inventors: Donald Federico, Grass Lake, MI (US); Yasushi Kondo, Aichi (JP); Daniel Todd Smith, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 569 days.

(21) Appl. No.: 13/445,976

(22) Filed: Apr. 13, 2012

(65) Prior Publication Data
US 2013/0271074 A1    Oct. 17, 2013

(51) Int. Cl.
*G06F 7/00* (2006.01)
*H02J 7/04* (2006.01)
*B60L 15/20* (2006.01)

(52) U.S. Cl.
CPC ............... *G06F 7/00* (2013.01); *B60L 15/2045* (2013.01); *H02J 7/041* (2013.01); *Y02T 10/7283* (2013.01)

(58) Field of Classification Search
CPC ........................... Y02T 90/14; B60H 1/00035
USPC ...................... 62/244; 701/22, 36; 165/42, 43
See application file for complete search history.

(56) References Cited

U.S. PATENT DOCUMENTS

| | | | |
|---|---|---|---|
| 5,524,446 A | 6/1996 | Hotta et al. | |
| 7,698,078 B2 * | 4/2010 | Kelty et al. | 702/63 |
| 7,797,958 B2 | 9/2010 | Alston et al. | |
| 2008/0300749 A1 * | 12/2008 | Hartmann et al. | 701/36 |
| 2009/0000310 A1 | 1/2009 | Bell et al. | |
| 2009/0021385 A1 | 1/2009 | Kelty et al. | |
| 2009/0139781 A1 | 6/2009 | Straubel | |
| 2010/0132388 A1 * | 6/2010 | Oyobe et al. | 62/157 |
| 2011/0133688 A1 * | 6/2011 | Ishibashi | 320/101 |

* cited by examiner

*Primary Examiner* — Drew A Dunn
*Assistant Examiner* — Zixuan Zhou
(74) *Attorney, Agent, or Firm* — Gifford, Krass, Sprinkle, Anderson & Citkowski, P.C.

(57) ABSTRACT

The departure time scheduling control system includes an electric vehicle having an electric power storage device and an interior climate control device operable to vary an interior temperature. A user interface includes a display and an input portion which allows a user to schedule a departure time having a temperature setting and a charge mode setting having an immediate mode and a delayed mode. A charger unit controls the charging of the electric power storage device to the preset charge level accordingly to the charge mode setting by the departure time. A controller activates the interior climate control device to bring the interior temperature to the temperature setting by the departure time. The controller also activates the charger unit to charge the electric power storage device according to the charge mode setting to the preset charge level by said departure time.

20 Claims, 3 Drawing Sheets

DEPARTURE TIME SCHEDULING CONTROL SYSTEM FOR AN ELECTRIC VEHICLE

FIELD OF THE INVENTION

The present invention is related to a departure time scheduling control system for an electric vehicle, and in particular, to a system that allows a user to set a departure time in which an interior temperature of the vehicle is brought to a preset temperature by the set departure time and a vehicle electric storage device is charged to a preset charge level by the set departure time.

BACKGROUND OF THE INVENTION

It is known to provide modern automotive vehicles with interior comfort control systems. Such systems include a heating, venting, air conditioning (HVAC) system that allows a user to select a desired interior temperature of the automotive vehicle. However, the systems require the vehicle to be manually started in order for the HVAC system to conduct the climate control.

With the increasing sophistication of modern electric vehicles, users require the ability to have additional comfort levels of the vehicle prior to entering. The previously known pre-climate control or remote engine starters required a user to activate a button, typically on the key fob, in order to remote start the vehicle's engine. Moreover, upon remote start of the internal combustion engine, the interior climate control system merely operates at whatever level the environmental control was previously set to prior to the shut off of the vehicle. As such, the previously known remote engine starters failed to provide the ability to schedule specific start times of the vehicle far in advance or the ability to select the desired interior temperature of the automotive vehicle.

In addition, with the increase in popularity of electric vehicles, users are often for the first time required to charge the electric vehicle. It is known to provide separate charging stations that will delay the charge of an electric vehicle to a time when electric power consumption rates are decreased or discounted at non-peak time periods. However, such charging stations require an additional setup by the user and do not take into account the next time a user will require the vehicle. As such, the delay in charging could result in the electric vehicle not receiving a full charging session by the time that the user requires use of the electric vehicle.

Thus, there exists a need for an electric vehicle in which a user can schedule a specific departure time at which the interior temperature of the vehicle would be at a preset temperature by the departure time and which allows for the completion of a charging session by the departure time.

SUMMARY OF THE INVENTION

The present invention provides a departure time scheduling control system for an electric vehicle which overcomes the above-mentioned disadvantages of the previously known pre-climate control systems and separate charge stations by providing any user interface that allows a driver to schedule a departure time having both temperature settings and charge settings.

In brief, the departure time scheduling control system includes an electric vehicle, a user interface, a charger unit and a controller. The electric vehicle includes an electric power storage device and an interior climate control device. The interior climate control device is operable to vary an interior temperature of the vehicle. The user interface includes a display portion and an input portion which allows a user to schedule a departure time. The departure time includes a temperature setting and a charge mode setting having an immediate mode and a delayed mode. The charger unit is operable to control the supply of electric power to the preset charge level accordingly to the charge mode setting by the departure time.

The controller activates the interior climate control device to bring the interior temperature of the vehicle to the temperature setting by the departure time. The controller also activates the charger unit to charge the electric power storage device according to the charge mode setting selected by the user such that the electric power storage device is charged to set preset charge level by the departure time. In the immediate charge mode, the charger unit charges the electric power storage device to a preset charge level immediately upon the detection of a connection between an external power supply connector and the external power supply.

In the delayed charge mode, the charger unit charges the electric power storage device to the preset charge level by the departure time. The delayed charge mode allows for a charge rate that promotes longevity of the electric power storage device. The delayed charge mode also allows for the charger unit to charge the electric power storage device at non-peak hours so as to reduce cost for the user and to decrease power consumption during high electric use time periods.

BRIEF DESCRIPTION OF THE DRAWINGS

A better understanding of the present invention will be had upon reference to the following detailed description when read in conjunction with the accompanying drawings, wherein like reference characters refer to the like parts throughout the several views and in which.

DETAILED DESCRIPTION OF THE INVENTION

This invention has utility as a departure time scheduling control system for an electric vehicle which overcomes the above-mentioned disadvantages. The departure time scheduling control system includes a user interface that allows a user to schedule a departure time including a temperature setting and a charge mode setting. The inventive departure time scheduling control system provides a user with the ability to schedule a departure time that will ready the interior temperature of the vehicle and provide the electric power storage device is charged to a preset charge level by the departure time.

Figure 1:
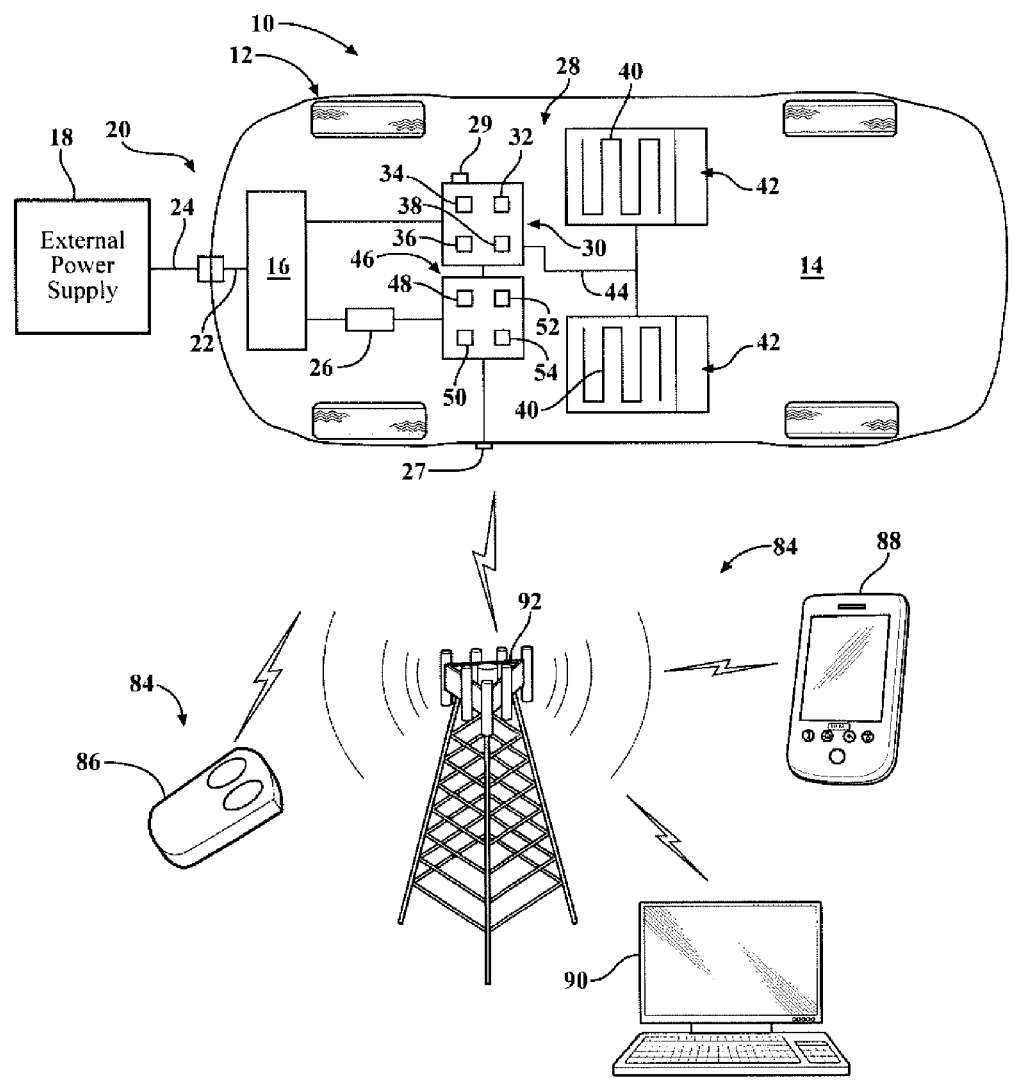
FIG. 1 is a schematic illustration of an electric vehicle with the inventive departure time scheduling control system.

With reference to FIG. 1, a departure time scheduling control system of the present invention is generally shown at reference 10. The system 10 includes an electric vehicle 12 having an interior passenger compartment 14. The vehicle 12 is a vehicle in which a drive power is at least partially output from a motor generator (not shown) powered by an electric power storage device 16 such as a battery. The electric power storage device 16 is optionally a single or plurality of batteries or fuel cells.

The vehicle 12 is optionally a type of vehicle known as a plug in hybrid vehicle in which drive power is supplied by the combination of the motor generator and an internal combustion engine, or an electric plug in vehicle in which the drive power is supplied entirely by the motor generator which is powered by electric power stored in the electric power storage device 16. The electric power storage device 16 allows for the recharging of the depleted electric power from an external power source 18. The electric power storage device 16 is connected to the external power source 18 via an external power supply connector 20.

The external power supply connector 20 includes a vehicle side connector 22 and an external side connector 24 which engage to electric supply power from the external power supply 18 to the electric power storage device 16. The vehicle side connector 22 is provided at the exterior of the vehicle 12 and is optionally a receiving inlet or a retractable cord having a plug that is connected to the electric power storage device 16. It is appreciated of course, that the external power supply connector 20 is optionally a wireless power transfer device in which the vehicle side connector 22 is a vehicle side power receipt side coil and the external connector side 24 is a power transmission coil which supplies electric power from the external power supply 18 to the electric power storage device 16 via electro-magnetic induction.

A charger unit 26 is provided in the electric vehicle 12. The charger unit 26 is operable to detect whether the external power supply connector 20 is connected to the external power supply 18 in such a manner as to allow for the supply of electric power of the external power supply 18 to the electric power storage device 16. The charger unit 26 controls the charging of the electric power storage device 16 and monitors the charge level of the electric power storage device 16. The charger unit 26 will discontinue charging operation once the electric power storage device 16 has reached a preset charge level. The charger unit 26 also monitors the state of charge (SOC) of the electric power storage device 16 in order to monitor charge level and remaining useful life (RUL) of the electric power storage device 16.

The electric vehicle 12 includes an interior climate control device 28 which allows a user to selectively vary the interior temperature of the interior passenger compartment 14. The interior climate control device 28 includes a heating, vent, and air conditioning (HVAC) module 30. The HVAC module 30 includes a heater 32, an air conditioner 34, electronically controlled front or rear windshield defrosters 36, and vent system 38 for directing the heated or cooled air from the heater 32 or the air conditioner 34, respectively. The vent system 38 includes vents provided throughout the interior passenger compartment 14. The interior climate control device 28 further includes an exterior temperature sensor 27 which detects the exterior temperature of the electric vehicle 12, and an interior temperature sensor 29 provided in the passenger compartment 14 which detects the interior temperature of the passenger compartment 14.

The interior climate control device 28 optionally includes seat heaters 40 provided in the vehicle seats 42. The seat heaters 40 typically include electrical resistive wiring that provides heat to a bottom portion and/or back portion of the seat 42 as is known to those skilled in the art. A pathway 44 provides an electric communication link between the interior climate control device 28 and the seat heaters 40. The pathway 44 optionally provides for the electric power transmission from the electric power storage device 16 to the seat heaters 40.

A controller 46 is an electrical communication with the charger unit 26 and the interior climate control device 28. The controller 46 includes a processor 48, a scheduling database 50, a receiver 52, and a user interface 54. The controller 46 is operable to activate and control the interior climate control device 28 even when the electric vehicle 12 is in a shut-off state by regulating the charger unit 26 to supply electric power from the electric power storage device 16 to the interior climate control device 28.

The controller 46 is operable to control the charger unit 26 such that the charger unit 26 is activated to begin a charging operation in which electric power from the external power source 18 is supplied to the electric power storage device 16 via the external power supply connector 20. Specifically, the controller 46 activates charger unit 26 and the charger unit 26 detects whether the external power supply connector 20 is connected to the external power supply 18 or the electric power storage device 16. Upon the detection that the electric power storage device 16 is connected to the external power source 18 through the external power supply connection 20, the controller 46 activates the charger unit 26 between an immediate charge mode and a delayed charge mode.

In both the immediate charge mode and the delayed charge mode, the charger unit 26 regulates the charging of the electric power storage device 16 to be charged to a preset charge level by a departure time set by a user, as described in greater detail below. In the immediate charge mode, the charger unit 26 charges the electric power storage device 16 to a preset charge level immediately upon the detection by the charger unit 26 that the vehicle side connector 22 and the external side connector 24 are connected in such a manner so as to transmit electric power from the external power storage device 18 to the electric power storage device 16.

In the delayed charge mode, the charger unit 26 will delay the charging of the electric power storage device 16 so as to charge the electric power storage device 16 during periods of non-peak consumption in which electric power from the external power storage device 18 is provided at a discounted or less expensive rate. In addition, the delayed charge mode allows the charger unit 26 to charge the electric power storage device 16 at a charge rate that promotes longevity of the electric power storage device 16. The external power supply 18 or the charger unit 26 can be manually or automatically provided with information regarding the charge rate of electric power or time periods of non-peak use in which rates are discounted or less expensive.

Figure 2A:
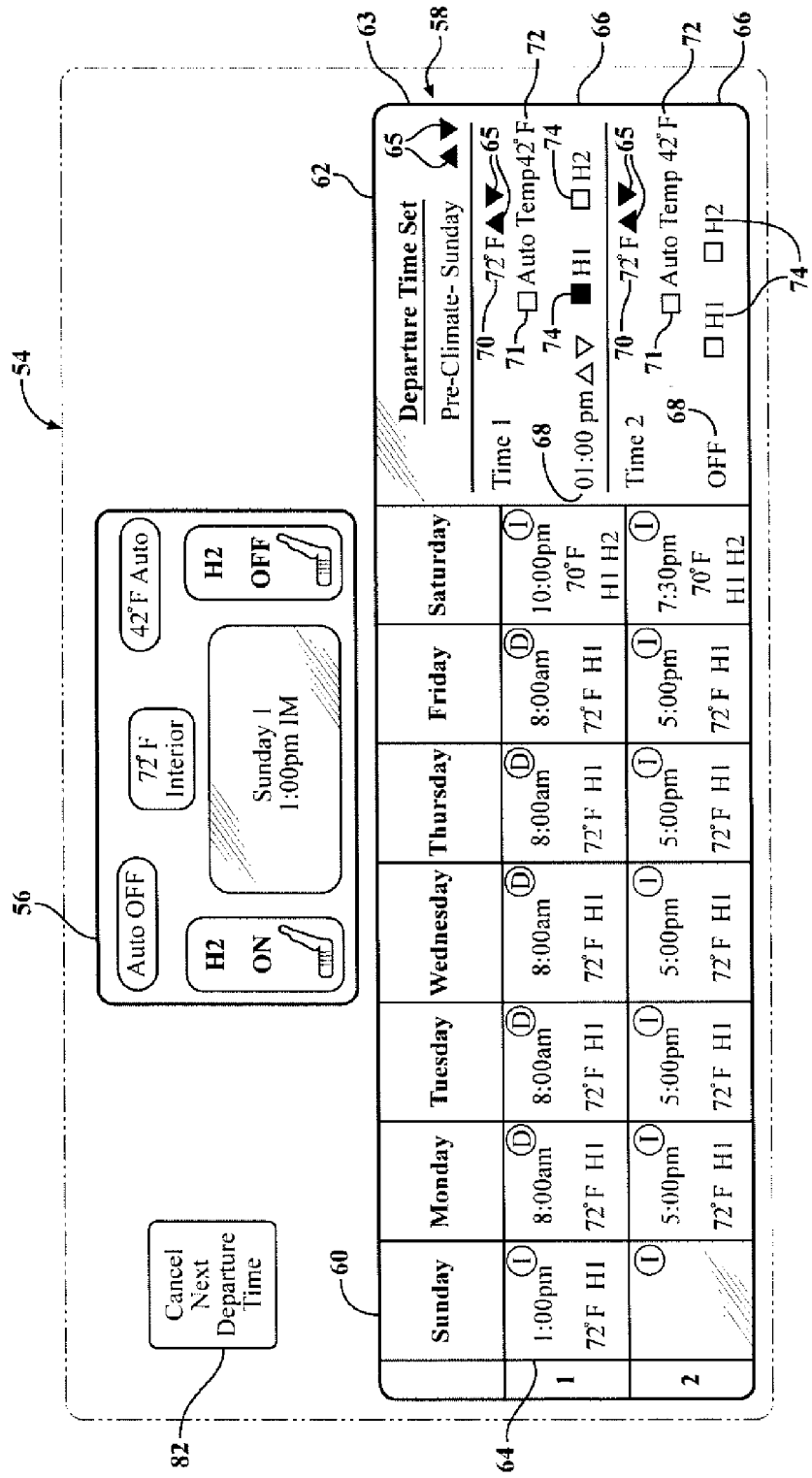
FIG. 2A is a view of a display portion of a user interface when a user is scheduling a temperature setting of a departure time.
Figure 2B:
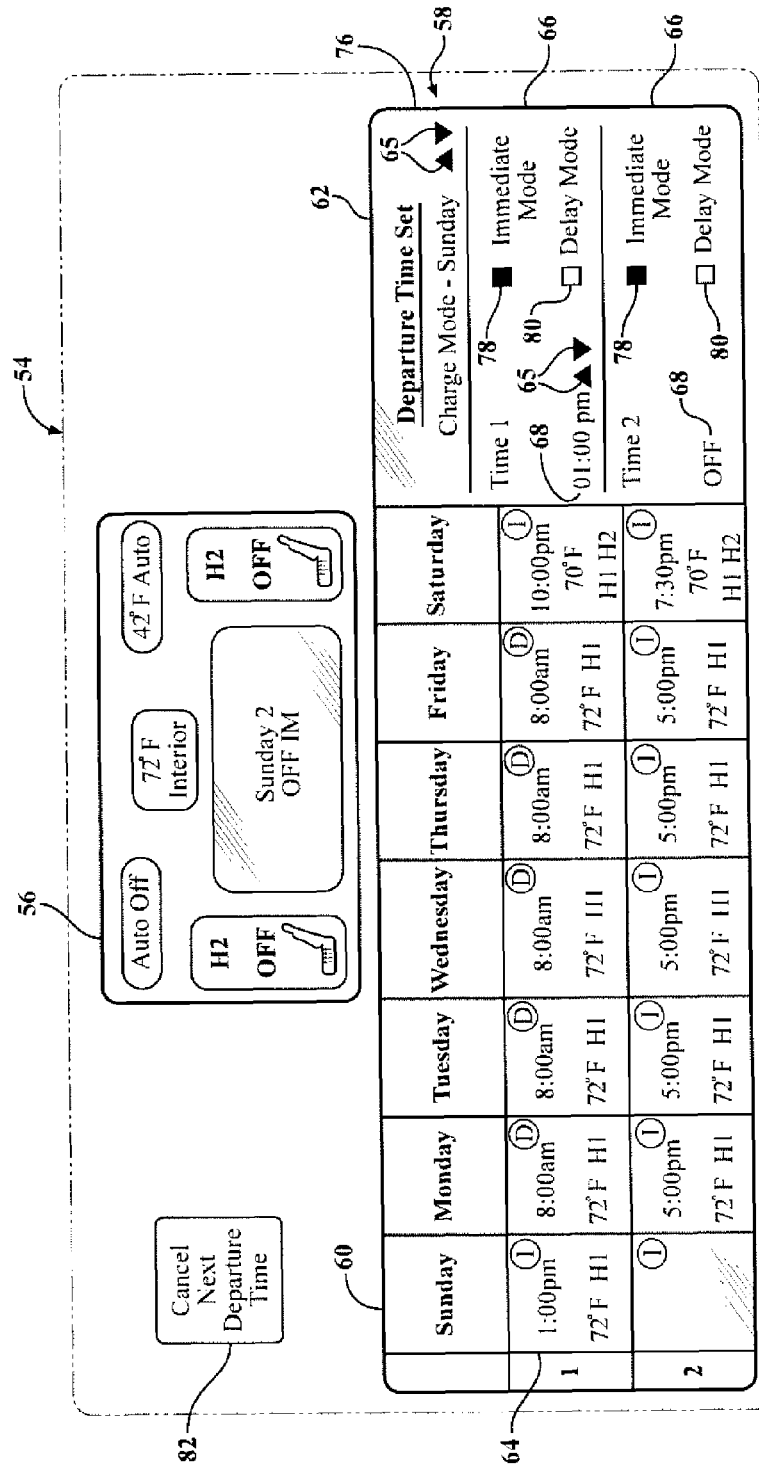
FIG. 2B is a view of a display portion of a user interface when a user is scheduling a charge mode setting of a departure time.

With reference to FIGS. 2A and 2B, the user interface 54 includes a display portion 56 and an input portion 58. It is appreciated of course, that the user interface 54 is a visual display device capable of displaying both the display portion 56 and the input portion 58, and having the ability to act as an input portion 58 itself through the use of an integrated capacitive touch sensor known as a touch screen to those skilled in the art. Such a touch screen user interface allows the user to select and input various information. However, the user interface 54, specifically the input portion 58, is not limited to being an integrated touch screen with the display portion 56. Optionally, the input portion 58 is a separate input selector such as a knob, buttons, keypad, or other various known input selectors known to those skilled in the art. In such an embodiment, the visual display of information in the illustrated input portion 58 is still displayed in the user interface 54 and a separate input portion 58 is used to input information by the user.

The input portion 58 includes a week section 60 and an individual day section 62. The week section 60 displays a schedule or chart that provides information regarding a departure time set by the user for each individual day of the week, including Sunday, Monday, Tuesday, Wednesday, Thursday, Friday, and Saturday. The week section 60 displays two departure times for each individual day of the week and includes a cell 64 for each departure time of each day of the week. The input departure times set by the user using the input portion 58 are stored in the scheduling database 50 for retrieval and execution by the controller 46. The scheduled departure time 68 stored in the cells 64 will be repeated weekly.

In order for a user to schedule a departure time 68, a user first selects a day of the week by actuation of the appropriate input portion 58. In the touch screen embodiment, a user selects one of the fourteen cells 64 corresponding to the first and second departure time rows for each day of the week. Alternatively, up and down arrows 65 are provided in the individual day section 62 and allow the user to progress through the days of the week until the required day is displayed. Once a specific day is selected, the user is navigated to a pre-climate mode selection portion 63 where the individual day section 62 of the input portion 58 will provide a display/input row 66 for a first departure time and a second departure time. In each of the first departure time and the second departure time rows 66, a user can select a numerical time value for the departure time 68 including the a.m. or p.m. designation. In addition, the user has the option of setting the departure time 68 in an off mode, as seen in the second departure time row of the individual day section 62 of FIG. 2A.

The departure time 68 is a time at which the user anticipates entering the electric vehicle 12 and beginning driving operation. In each departure time slot 66, a user is provided with a temperature setting 70. The temperature setting 70 is the desired temperature of the interior of the interior passenger compartment 14 at which the user would prefer the interior temperature of the passenger compartment 14 to be at the selected departure time 68. Stated differently, a user having a routine in which the user knows the time at which the user will leave the house can program the departure time scheduling control system 10 with the user's anticipated departure time 68 in the departure time slot 66 and the user can select the requested temperature setting 70. The controller 46 with the vehicle 12 in the shut off state, activates the interior climate control device 28 to measure the interior temperature of the passenger compartment 14 using the interior temperature sensor 29 and utilizes a pre-stored map to calculate the required climate conditions of the HVAC system 30 including specific output temperature of the heater 32 or air conditioner 34, flow rate of the output of heated or cooled air through the vent 38, and time required at the calculated level so as to have the interior temperature of the passenger compartment 14 be brought to the temperature setting 70 by an immediately upcoming departure time 68.

Once the interior climate control device 28 has regulated the HVAC system 30 so as to have the interior temperature of the passenger compartment 14 of the electric vehicle 12 be equal to the selected temperature setting 70, the interior climate control device 28 will continue control of the HVAC system 30 such that the interior temperature of the passenger compartment 14 remains equal to the selected temperature setting 70 for a pre-determined period of time after reaching one of the first departure time or the second departure time. The pre-determined period of time is optionally set by the user or a preset value illustratively including 15 to 30 minutes.

In addition to inputting a departure time 68 and a temperature setting 70, a user is provided with the ability to select an auto setting 71 in which a user selects an auto temperature 72. In the auto setting 71, the controller 46 compares the either the detected interior temperature measured by the interior temperature sensor 29 or the detected exterior temperature measured by the exterior temperature sensor 27 to the auto temperature 72. The auto setting 71 is operable in a heating mode and a cooling mode depending upon whether the auto temperature 72 is below or above a preset threshold, respectively. An example of such a preset threshold is optionally 50° F.

In the heating mode, if the interior temperature or exterior temperature is equal to or lower (such as 32° F.) than the auto temperature 72 (such as 42° F.) the controller 46 activates the interior climate control system 28 to bring the interior temperature of the passenger compartment 14 to the temperature setting 70 by the departure time 68; however, if the interior temperature or exterior temperature (such as 52° F.) is above the auto temperature 72 (such as 42° F.) the controller 46 does not activate the interior climate control device 28 to regulate the interior temperature to the temperature setting 70 by the departure time 68.

In the cooling mode, if the interior temperature or exterior temperature is equal to or lower (such as 62° F.) than the auto temperature 72 (such as 72° F.) the controller 46 does not activate the interior climate control device 28 to regulate the interior temperature to the temperature setting 70 by the departure time 68; however, if the interior temperature or exterior temperature (such as 82° F.) is above the auto temperature 72 (such as 72° F.) the controller 46 activates the interior climate control system 28 to bring the interior temperature of the passenger compartment 14 to the temperature setting 70 by the departure time 68.

The auto setting 71 allows a user to avoid heating or cooling the interior temperature of the passenger compartment 14 to the temperature setting 70 of the departure time 68 in situations where the external or internal temperature of the electric vehicle 12 does not require heating or cooling of the vehicle 12 prior to its entrance by the user. Stated differently, during days of unseasonably warm winter weather or cool summer weather in which the vehicle is at or would reach the temperature setting in a relatively quick time period, a user may not want to expend the electric power stored in the electric power storage device 16 (when the electric power storage device 16 is not connected to the external power supply 18 via the external power supply connector 20), or utilize electric power from the external power supply 18 when the external power supply connector 20 connects the external power supply 18 to the electric power storage device 16.

The user is also provided with the heated seat inputs 74 which allow the user to select the seat heater 40 of the vehicle seats 42 to be turned on by the departure time 68. In the illustrated embodiment, the electric vehicle 12 includes two vehicle seats 42 and as such, the input section 58 of the user interface 54 includes two heated seat inputs 74 for each departure time 68 allowing a user to select one, two, or none of the seat heaters of vehicle seats to be turned on by the departure time. The controller 46 uses the detected interior temperature from the interior temperature sensor 29 to measure the interior temperature of the passenger compartment 14 and utilizes a pre-stored map to calculate the required time needed for the electric for the seat heater 40 to reach the selected seat heat level. It is appreciated of course, that the input portion 58 allows a user to select various levels of seat heat including high, medium, and low. Alternatively, the controller 46 activates the seat heater 40 at a predetermined time prior to the next scheduled departure time 68.

Once a user has inputted either one or both of the departure time 68 for the selected cell 64 in the week display portion 60, the user is navigated to a charge mode selection portion 76, as best seen in FIG. 2B. In the charge mode selection portion 76, the user selects the specific day similar and for each departure time 68, the user is provided with a choice between an intermediate mode selection 78 and a delayed mode selection 80.

The controller 46 will activated the charger unit 26 to regulate the charging of the electric power storage device 16 dependent upon the mode selected. In the immediate mode, the charger unit 26 will begin charging the electric power storage device 16 to the preset charge level upon determination that the vehicle side connector 22 is engaged with the external power side 24.

In the delayed charge mode, the charger unit 26 regulates the charging of the electric power storage device 16 according to a pre-stored charging rate which promotes longevity of electric power storage device 16 and/or delays charging of the electric power storage device 16 until non-peak hours in which electric power is provided at a discounted or less expensive rate. The charger unit 26 regulates the charging of electric power storage device 16 in delayed charging mode so that the electric power storage device will be charged to the pre-set charge level by the set departure time 68. In the delayed mode, the controller 46 activates the charger unit 26 which compares the immediately subsequent departure time 68 to the current time and determines a charge rate in which the electric power source device 16 will be charged to the preset charge level by the user's next set departure time.

In the event that a user does not enter a departure time 68 for a first departure time or a second departure time for each day of the week, the charge mode is set as a default to the immediate charge mode and the controller 46 will control the charger unit 26 to charge the electric power storage device 16 to the preset charge level upon connection of the vehicle side connector 22 to the external power supply connector 24. The default setting is the immediate charge mode as without a set departure time it is unknown when the user anticipates using the electric vehicle 12 and waiting to charge electric power source device 16 at non-peak hours or at a charging rate which promotes longevity of the electric power source device 16 would result in the electric power device 16 having a charge level which is not sufficient for the user's intended driving needs.

Accordingly, by providing a user interface 54 which allows a user to set a departure time 68 including a temperature setting 70 and a charge mode allows a user to have a vehicle 12 which the internal temperature is brought to the temperature setting 70 by departure time 60 and in which the electric power storage device 16 is charged to a preset charge level by the departure time 68.

The user interface 54 uses the display portion 56 to display the settings of the immediately subsequent set departure time to the user upon the vehicle shutoff. More specifically, upon the user reaching a destination and shutting down the electric vehicle 12, the display portion 56 will display the next set departure time including the day of the set departure time 68, the temperature setting 70, the status of the auto setting 71, the auto temperature 72, the status/level of the heated seat inputs 74, and the charging mode (IM or DM). By providing the user with a display of the next scheduled departure time 68 including the temperature setting 70 and the charge mode in the display portion 56 provides verification to the user that such departure time 68 including the temperature setting 70 and the charge mode is acceptable.

Upon the determination that the next scheduled departure time 68 is not needed, the user is provided the ability to cancel the next upcoming departure time 68 by actuation of a cancel button 82. It is appreciated of course, that the cancel button 82 is optionally a portion of the user interface 54 utilizing the touch screen technology or a separate cancel button. In addition, it is appreciated of course, that the display portion 56 is a separate visual display unit from the input portion 58 such that the display portion 56 is provided within the instrument cluster and the input portion 58 is provided in a separate visual display unit in the instrument panel.

With reference to FIG. 1, the departure time scheduling control system 10 further include a portable terminal 84 which is capable of communicating with the receiver 50 of the controller 46 to allow a user to schedule a departure time including temperature setting and charge more or cancel an upcoming next departure time. It is appreciated of course, that the portable terminal 84 is portable with respect to the electric vehicle and optionally and illustratively includes a key fob 86, cellular telephone 88, or any other computer device 90. The key fob 86 communicates directly with the receiver radio frequency or any other frequency known to those skilled in the art while the cellular telephone and the computer device 90 communicate with the receiver 50 via a network 92 illustratively including a cellular telephone network, Bluetooth, and/or the interne. It is appreciated, of course, that in addition to the portable terminal 84, setting a departure time, or canceling an upcoming next departure time, the portable terminal is operable to initiate pre-climate conditioning such that the control unit 46 and processor 48 will control the interior climate control device 28 and the charger unit 26 to begin regulating the internal temperature of the passenger compartment 14 of the vehicle to a temperature setting 72 set by the portable terminal 84 and begin the immediate charging of the electronic power storage device 16 to a pre-set charge level.

From the foregoing, it can be seen that the present invention provides a departure time scheduling control system which allows a user to schedule a departure time including a temperature setting and charge mode such that interior temperature of the vehicle will be equal to the set temperature setting and the electric power storage device will be charged to a pre-set charge level by the set departure time. Having described the invention, however, many modifications thereto will be compared to those skilled in the art to which it pertains without deviation from the spirit of the invention as defined by the scope of the appended claims.

It is claimed:

1. A departure time scheduling control system comprising:
    an electric vehicle having an electric power storage device and an interior climate control device operable to vary an interior temperature of said electric vehicle;
    a scheduling database;
    a user interface having a display portion and an input portion, said user interface operable to allow a user to store, in said scheduling database, a scheduled schedule a first departure time and a second departure time, using said input portion, for each individual day of a week, each of said first departure time and said second departure time includes including a temperature setting and a charge mode setting, said charge mode setting having an immediate mode and a delayed mode, said display portion displays a schedule illustrating each day of the week and displays said first departure time and said second departure time associated with each individual day of the week;
    a charger unit operable to control the supply of electric power from an external power supply to charge the electric power storage device to a preset charge level; and
    a controller that activates said interior climate control device to bring said interior temperature of said electric vehicle to said temperature setting by an immediately upcoming departure time, and said controller activates said charger unit to charge said electric power storage device to said preset charge level according to said charge mode setting by said immediately upcoming departure time.

2. The departure time scheduling control system of claim 1, further comprising:

an external power supply connector that connects and disconnects to said external power supply, said external power supply connector supplies electric power from said external power supply to said electric power storage device;

said charger unit operable to detect whether said external power supply connector is connected to said external power supply, said charger unit operable to control said external power supply connector to supply power to said electric power storage device to charge said electric power storage device to said preset charge level;

said controller activates said charger unit to charge said electric power storage device to said preset charge level when said charger unit detects that said external power supply connector is connected to said external power supply according to said charge mode setting.

3. The departure time scheduling control system of claim 2, wherein said charger unit in said immediate mode charges said electric power storage device to said preset charge level immediately upon detection of connection between the external power supply connector and said external power supply, and said charger unit in said delayed mode charges said electric power storage device to said preset charge level by said immediately upcoming departure time.

4. The departure time scheduling control system of claim 1, wherein said display portion of said user interface displays said temperature setting and said charge setting for said immediately upcoming departure time upon shutoff of said electric vehicle.

5. The departure time scheduling control system of claim 1 further comprising a terminal portable with respect to the electric vehicle, said terminal operable to schedule or cancel said immediately upcoming departure time.

6. The departure time scheduling control system of claim 5, wherein said terminal is a key fob.

7. The departure time scheduling control system of claim 5, wherein said terminal is a cellular phone.

8. The departure time scheduling control system of claim 1, wherein said control device cancels control of said interior climate control device after an expiration of a predetermined time period after reaching one of said first departure time or said second departure time.

9. The departure time scheduling control system of claim 1, wherein said controller activates said interior climate control device to bring said interior temperature of said vehicle to said temperature setting by said immediately upcoming departure time stored in said scheduling unit when said external power supply connector is connected to or disconnected from said external power source.

10. The departure time scheduling control system of claim 1, wherein said electric vehicle includes an exterior temperature sensor to detect an exterior temperature and an interior temperature sensor to detect said interior temperature of said electric vehicle, wherein said temperature setting includes an auto setting having a heating mode and a cooling mode, said auto setting having an auto temperature selectable by said user, said auto setting operable in said heating mode when said auto temperature is below a preset threshold and said auto setting operable in said cooling mode when said auto temperature is above said preset threshold, and wherein in said heating mode said controller activates said interior climate control device to bring said interior temperature of said vehicle to said temperature setting when said interior temperature or said exterior temperature is equal to or lower than said auto temperature, and wherein in said cooling mode said controller activates said interior climate control device to bring said interior temperature of said vehicle to said temperature setting when said interior temperature or said exterior temperature is greater than said auto temperature.

11. The departure time scheduling control system of claim 1, wherein said vehicle includes a vehicle seat having a seat heater, and wherein said temperature setting includes a heated seat setting having an on and an off mode, and wherein said controller activates the interior climate control system to activate said heated seat by said immediately upcoming departure time when said heated seat setting is in said on mode.

12. A departure time scheduling control system comprising:

an electric vehicle having an electric power storage device and an interior climate control device operable to vary an interior temperature of said electric vehicle;

a scheduling database;

a user interface having a display portion and an input portion, said user interface operable to allow a user to store, in said scheduling database, a scheduled a first departure time and a second departure time, using said input portion, for each individual day of a week, each of said first departure time and said second departure time includes a temperature setting and a charge mode setting, said charge mode setting having an immediate mode and a delayed mode, said display portion of said user interface displays said temperature setting and said charge setting for an immediately upcoming departure time upon shutoff of said electric vehicle;

a charger unit operable to control the supply of electric power from an external power supply to charge the electric power storage device to a preset charge level;

a controller that activates said interior climate control device to bring said interior temperature of said electric vehicle to said temperature setting by said immediately upcoming departure time, and said controller activates said charger unit to charge said electric power storage device to said preset charge level according to said charge mode setting by said immediately upcoming departure time.

13. The departure time scheduling control system of claim 12, further comprising:

an external power supply connector that connects and disconnects to said external power supply, said external power supply connector supplies electric power from said external power supply to said electric power storage device;

said charger unit operable to detect whether said external power supply connector is connected to said external power supply, said charger unit operable to control said external power supply connector to supply power to said electric power storage device to charge said electric power storage device to said preset charge level;

said controller activates said charger unit to charge said electric power storage device to said preset charge level when said charger unit detects that said external power supply connector is connected to said external power supply according to said charge mode setting.

14. The departure time scheduling control system of claim 13, wherein said charger unit in said immediate mode charges said electric power storage device to said preset charge level immediately upon detection of connection between the external power supply connector and said external power supply, and said charger unit in said delayed mode charges said electric power storage device to said preset charge level by said immediately upcoming departure time.

15. The departure time scheduling control system of claim 12 further comprising a terminal portable with respect to the electric vehicle, said terminal operable to schedule or cancel said immediately upcoming departure time.

16. The departure time scheduling control system of claim 15, wherein said terminal is a key fob or a cellular phone.

17. The departure time scheduling control system of claim 12, wherein said control device cancels control of said interior climate control device after an expiration of a predetermined time period after reaching one of said first departure time or said second departure time.

18. The departure time scheduling control system of claim 12, wherein said controller activates said interior climate control device to bring said interior temperature of said vehicle to said temperature setting by said immediately upcoming departure time stored in said scheduling unit when said external power supply connector is connected to or disconnected from said external power source.

19. The departure time scheduling control system of claim 12, wherein said electric vehicle includes an exterior temperature sensor to detect an exterior temperature and an interior temperature sensor to detect said interior temperature of said electric vehicle, wherein said temperature setting includes an auto setting having a heating mode and a cooling mode, said auto setting having an auto temperature selectable by said user, said auto setting operable in said heating mode when said auto temperature is below a preset threshold and said auto setting operable in said cooling mode when said auto temperature is above said preset threshold, and wherein in said heating mode said controller activates said interior climate control device to bring said interior temperature of said vehicle to said temperature setting when said interior temperature or said exterior temperature is equal to or lower than said auto temperature, and wherein in said cooling mode said controller activates said interior climate control device to bring said interior temperature of said vehicle to said temperature setting when said interior temperature or said exterior temperature is greater than said auto temperature.

20. The departure time scheduling control system of claim 12, wherein said vehicle includes a vehicle seat having a seat heater, and wherein said temperature setting includes a heated seat setting having an on and an off mode, and wherein said controller activates the interior climate control system to activate said heated seat by said immediately upcoming departure time when said heated seat setting is in said on mode.

* * * * *